United States Patent
Borovicka et al.

(10) Patent No.: US 9,211,039 B2
(45) Date of Patent: Dec. 15, 2015

(54) COOKING UTENSIL WITH STAB AND CATCH DETACHABLE HANDLE

(71) Applicant: Charcoal Companion Incorporated, Berkeley, CA (US)

(72) Inventors: Cory Thomas Borovicka, Oakland, CA (US); Kwame Phillips-Solomon, Emeryville, CA (US)

(73) Assignee: Charcoal Companion Incorporated, Berkeley, CA (US)

( * ) Notice: Subject to any disclaimer, the term of this patent is extended or adjusted under 35 U.S.C. 154(b) by 0 days.

(21) Appl. No.: 14/468,244

(22) Filed: Aug. 25, 2014

(65) Prior Publication Data

US 2015/0053707 A1   Feb. 26, 2015

Related U.S. Application Data

(60) Provisional application No. 61/869,382, filed on Aug. 23, 2013.

(51) Int. Cl.
   *B65D 25/10*   (2006.01)
   *A47J 45/07*   (2006.01)

(52) U.S. Cl.
   CPC ..................... *A47J 45/071* (2013.01)

(58) Field of Classification Search
   CPC ................ A47J 45/071; B65D 25/10
   USPC ........................ 220/761, 769, 775, 776, 759
   See application file for complete search history.

(56) References Cited

U.S. PATENT DOCUMENTS

| | | | |
|---|---|---|---|
| 823,415 A | 6/1906 | Krampitz | |
| 1,277,182 A * | 8/1918 | Borsse | A47J 45/071 220/759 |
| 1,355,332 A | 10/1920 | Hanson | |
| 2,494,159 A | 1/1950 | Bernstein | |
| 2,613,978 A | 10/1952 | Marulli | |
| 4,577,367 A | 3/1986 | Durand | |
| 5,048,882 A | 9/1991 | Fielding et al. | |
| 5,373,608 A | 12/1994 | Welch | |
| 6,712,412 B2 | 3/2004 | Kahler et al. | |
| 8,469,419 B2 | 6/2013 | Chapin | |
| 2006/0162128 A1 | 7/2006 | Prip | |

FOREIGN PATENT DOCUMENTS

| | | |
|---|---|---|
| EP | 1832212 | 9/2007 |
| EP | 1955629 | 8/2008 |
| EP | 2494898 | 9/2012 |

* cited by examiner

*Primary Examiner* — Anthony Stashick
*Assistant Examiner* — Raven Collins
(74) *Attorney, Agent, or Firm* — Beeson Skinner Beverly, LLP

(57) ABSTRACT

A cooking utensil has a food container, such as a cooking basket, and a lift bracket attached the sidewall of the food container. The lift bracket includes a riser portion having a catch opening and an outwardly extending upper ledge portion having an insertion opening in vertical plane alignment with the catch opening of the riser portion. A lift handle engages the lift bracket on the food container through the insertion opening in the lift bracket. An inwardly projecting catch tip on the engagement end of the lift handle can be made to catch the catch opening in the riser portion of the lift bracket when the lift bracket engagement end of the lift handle is fully inserted in the lift bracket. When the food container is lifted by the handle, the weight of the food container will maintain the engagement of the lift handle and lift bracket.

15 Claims, 4 Drawing Sheets

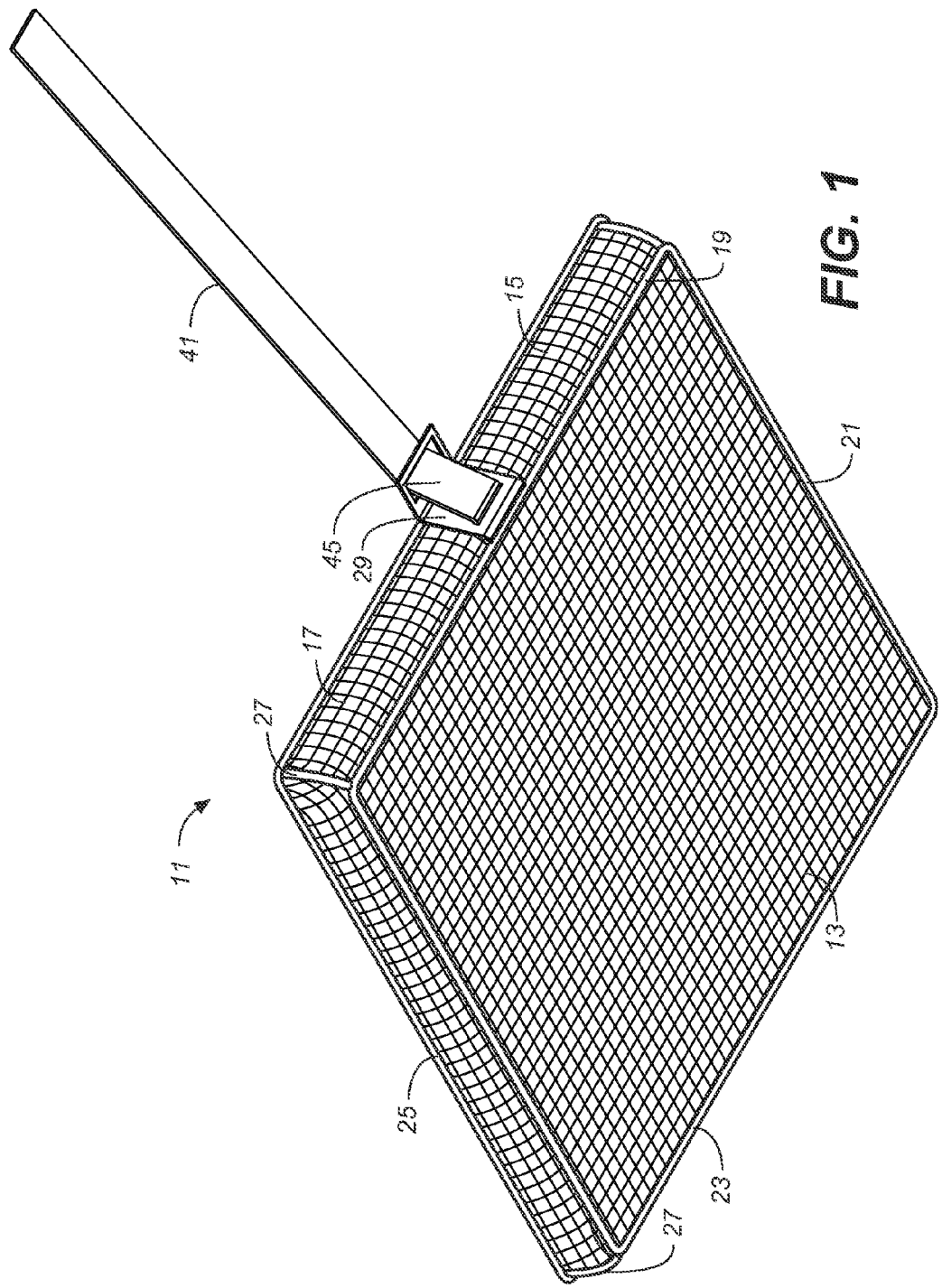

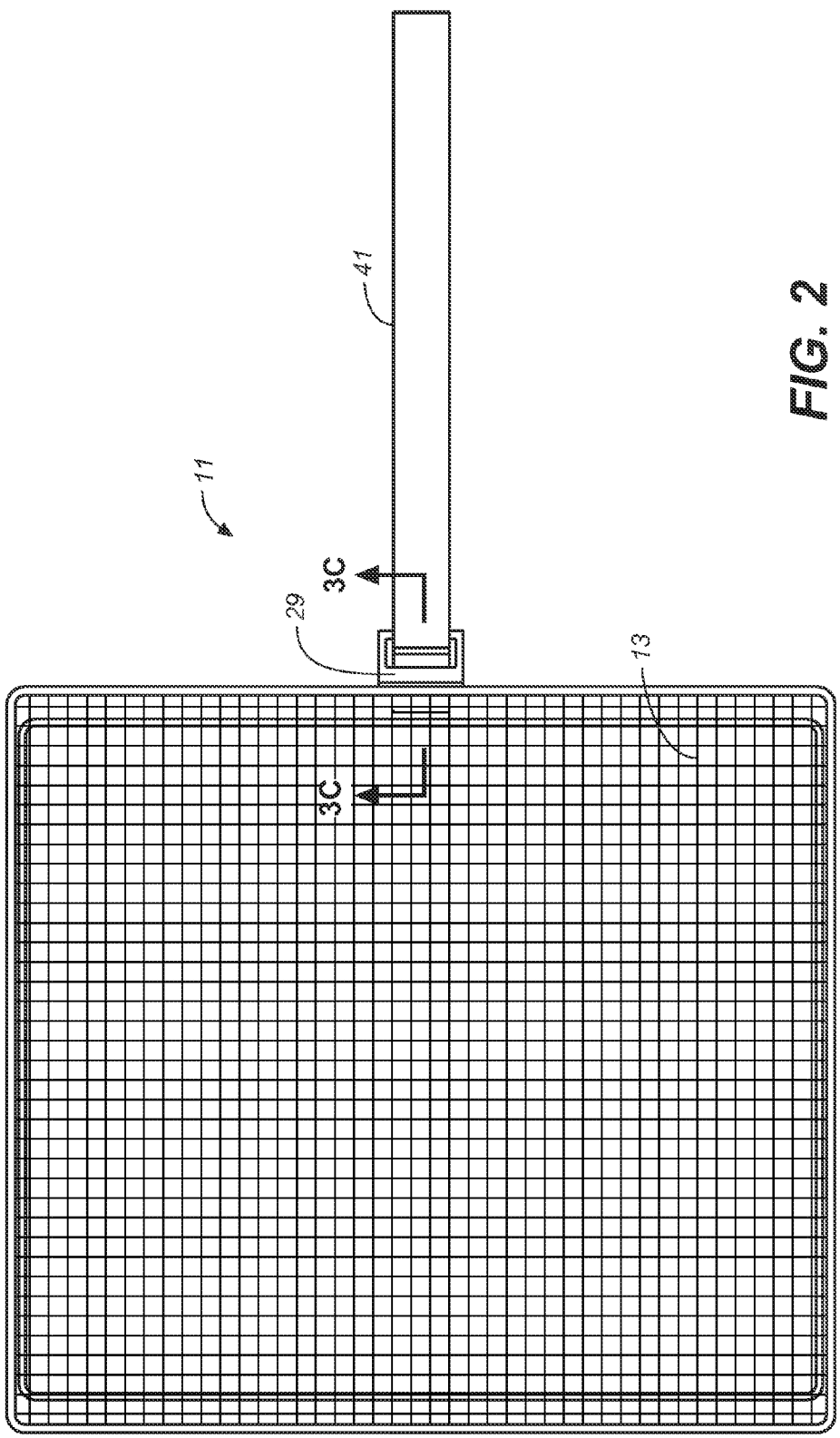

COOKING UTENSIL WITH STAB AND CATCH DETACHABLE HANDLE

CROSS-REFERENCE TO RELATED APPLICATIONS

This application claims the benefit of U.S. Provisional Patent Application No. 61/869,382, filed Aug. 23, 2013, which is incorporated herein by reference.

BACKGROUND

The present invention relates to cooking utensils, and more particularly cooking utensils that have detachable handles.

The use of detachable handles on cooking utensils such as pots and pans is well known. However, the attachment mechanisms used for such handles are often bulky, relatively costly to manufacture and cumbersome to use. The present invention provides a cooking utensil with a detachable handle and attachment mechanism that can be manufactured relatively inexpensively and that can easily be operated. When engaged, the detachable handle provides a secure attachment to the body of the utensil without the risk of becoming unintentionally dislodged or misaligned while the utensil is being held, moved or shaken. The attachment mechanism of the invention is particularly adapted for use with a cooking basket.

SUMMARY OF INVENTION

The invention is directed to a cooking utensil comprised of a food container, such as a cooking basket, having a sidewall, a top portion and a bottom portion. A lift bracket provided on the sidewall of the food container includes a riser portion having a catch opening, preferably proximate the bottom of the riser portion, and an outwardly extending upper ledge portion having an insertion opening in vertical plane alignment with the catch opening of the riser portion. A lift handle for engaging the lift bracket on the food container has an elongated gripping end and a lift bracket engagement end which extends downwardly at an angle relative to the gripping end. The lift bracket engagement end of the lift handle is sized for insertion through the insertion opening in the upper ledge portion of the lift bracket, preferably with a certain amount of play between the lift bracket and handle. An inwardly projecting catch tip on the engagement end of the lift handle is configured for engagement in the catch opening in the riser portion of the lift bracket when the lift bracket engagement end of the lift handle is inserted down through the insertion opening of the upper ledge portion of the lift bracket until the catch tip opposes the catch opening of the lift bracket. When fully engaged in the lift bracket, the lift handle can be rotated to move its catch tip into the lift bracket's catch opening, whereupon the food container can be lifted. When lifted, the weight of the food container will maintain the engagement of the catch tip of the engagement end of the lift handle in the catch opening of the lift bracket. The handle can be easily disengaged by simply setting the food container on a surface and taking the weight off of the lift bracket engagement end of the handle.

BRIEF DESCRIPTION OF DRAWINGS

FIG. 1 is a bottom perspective view of a cooking basket having a stab and catch detachable handle in accordance with the invention.

FIG. 2 is a top plan view thereof.

DESCRIPTION OF ILLUSTRATED EMBODIMENT

Figure 3A:
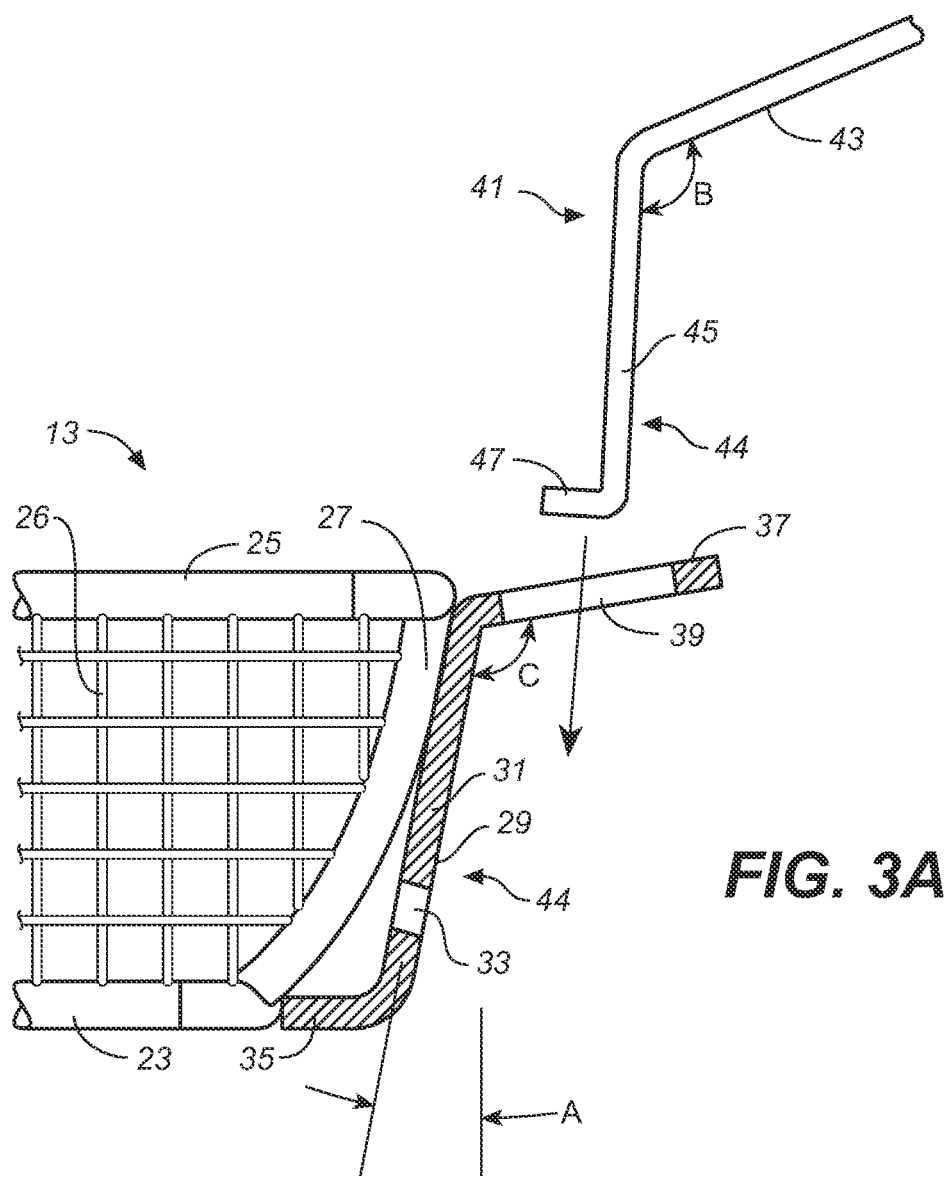
FIG. 3A is an enlarged fragmentary cross-sectional view thereof showing a first position in attaching the detachable handle to the attachment mechanism of the cooking basket.

Referring now to the drawings, FIG. 1 shows a cooking utensil, denoted by the numeral 11, comprised of a food container in the form of a basket 13 having sidewalls 15, a top portion 17 and a bottom portion 19, and further comprised of a detachable stab and catch lifting handle 41 later described. The illustrated basket is constructed of a frame 21 having interconnected frame members that include a bottom frame ring 23, a top frame ring 25 and corner posts 27. A wire mesh is stretched across and attached to these frame members, with the portion of the wire mesh 26 stretched between the bottom and top frame rings, together with the frame rings and corner posts, forming the sidewalls 15 of the basket. The frame members and wire mesh of basket 13 can suitably be fabricated of stainless steel.

A lift bracket 29 which can be engaged by detachable handle 41 is provided on one of the sidewalls of the basket. Suitably, the lift bracket is a separate metal part attached by any suitable attachment means to the sidewall. For example, the lift bracket could be spot welded to the top and bottom rings 23, 25 of the basket frame.

More specifically, the lift bracket is seen to include a riser portion, most suitably in the form of a riser wall 31, having a catch opening 33, and oppositely directed extending structures at the top and bottom of the riser wall, namely, an inwardly extending bottom shoulder 35 and an outwardly extending upper ledge portion 37. The bracket's riser wall extends generally from the bottom to the top portion of the basket side wall to which it is attached, and more particularly from the bottom frame ring to the top frame ring of the basket. Preferably, the riser wall angles slightly in toward the bottom of the basket as indicated by riser angle A in FIG. 3B. This angling of the riser wall can suitably be in the range of 10 to 15 degrees from vertical and will improve the ability of the detachable handle 41 to maintain engagement with the lift bracket when lifting the basket.

The lift bracket's inwardly extending bottom shoulder 35 is seen to extend to and butt against the bottom frame ring of the basket, where it provides a structure by which the bottom of the lift bracket can be attached to the bottom of the basket frame. It is contemplated that the lift bracket could be attached to the illustrated basket or other food container without a bottom attachment, however, a bottom attachment as well as a top attachment will provide a more secure attachment where the lift bracket is less likely to be broken off. It is also noted that the sidewall configurations of food containers can vary, and in some cases a bottom attachment could be made without an inward extension at the bottom of the lift bracket. It is still further contemplated that, instead of providing the lift bracket with an inward bottom extension, the bottom of the lift bracket could be attached to the bottom of the basket using a separate spacer insert.

The bracket's outwardly extending upper ledge portion 37, which provides a resting platform for detachable handle 41, is seen to include an insertion opening 39 which is in a vertical plane alignment with the riser wall's lower catch opening 33. The vertical plane alignment of these two openings in the lift bracket will allow the lift handle to engage in both openings for picking up the basket with the stab and catch maneuver hereinafter described. Preferably, the upper ledge portion of the lift bracket will be relatively short so that it is not obtrusive when the lift handle is detached from the basket. But this ledge needs to be long enough to accommodate insertion opening 39 and to provide a resting platform for the handle. The lift bracket's upper ledge is also preferably angled relative to the bracket's riser wall 31 such that, when the lift bracket is attached to the side of basket 13, the upper ledge portion extends upwardly at a slight angle relative to horizontal. This will allow the illustrated detachable handle to extend up at an angle away from the heat source when engaged in the lift bracket.

The illustrated lifting handle 41 has a configuration that advantageously allows for the desired engagement of the handle in the lift bracket using a stab and catch maneuver. The lifting handle, which, like the basket 13, is suitably fabricated of stainless steel, has an elongated upper gripping end 43 and a lift bracket engagement end 44 comprised of an extension arm 45, which extends downwardly at an angle relative to the gripping end as denoted by angle B in FIG. 3A, and a catch tip 47 at or proximate the end of the extension arm. The lift bracket engagement end of the handle will have a cross-sectional size that allows it to easily be inserted through the insertion opening in the top ledge portion 37 of the lift bracket, and the extension arm 45 of the engagement end of the handle will have a length that positions catch tip 47 in opposition to the lower catch opening 33 of the lift bracket's riser wall when the engagement end of the handle is inserted to its maximum depth through the insertion opening 39.

Figure 3B:
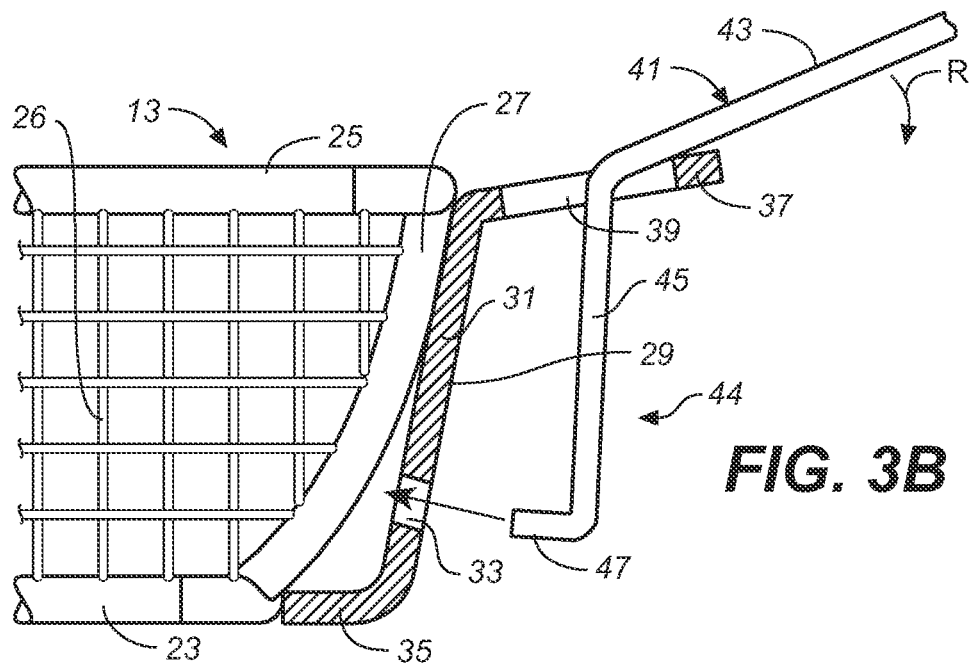
FIG. 3B is another enlarged fragmentary cross-sectional view thereof showing a second position in attaching the detachable handle to the attachment mechanism of the cooking basket.
Figure 3C:
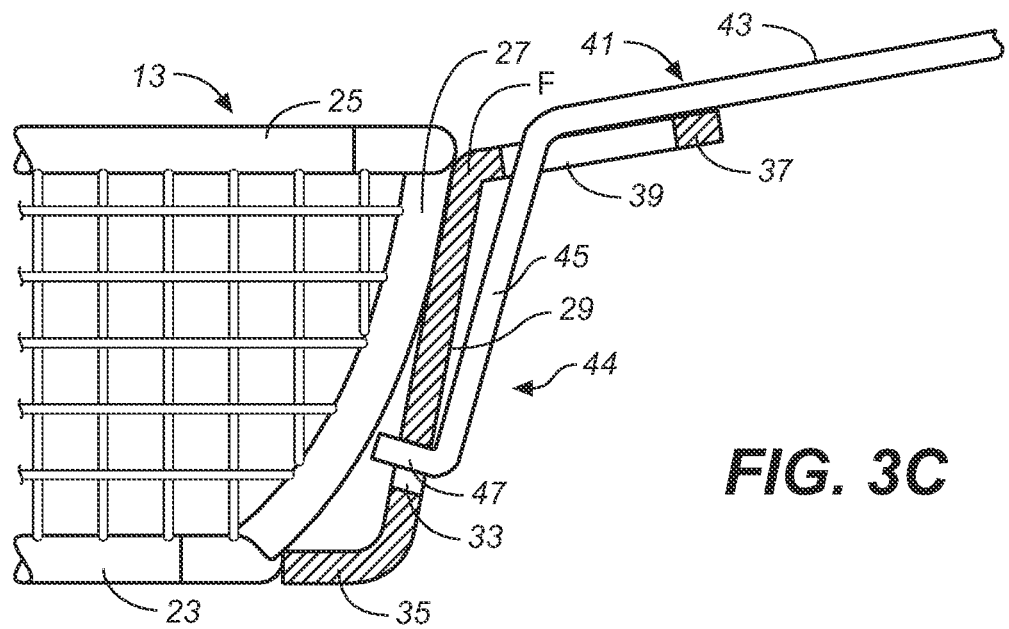
FIG. 3C is a further enlarged fragmentary cross-sectional view thereof taken along lines 3C-3C in FIG. 2, showing a third and fully engaged position in attaching the detachable handle to the attachment mechanism of the cooking basket.

Maneuvering handle 41 into locking engagement with the basket's lift bracket can be further described in reference to FIGS. 3A-3C. To pick up and lift the basket 13, the lift bracket engagement end of the lifting handle is first positioned over the upper ledge portion 37 of the lift bracket and inserted through the insertion opening in the lift bracket as shown in FIG. 3A. The user continues to insert the engagement end of the lift bracket through the insertion opening until the gripping end contacts and rests against the lift bracket's upper ledge portion as shown in FIG. 3B. The insertion opening in the lift bracket is preferably wide enough to allow some play between the lift handle and lift bracket at the insertion opening as shown in FIG. 3B so that the handle can be moved laterally within the lift bracket when fully inserted into the lift bracket.

Once the handle's bracket engagement end 44 is fully inserted in the lift bracket as shown in FIG. 3B, the tip portion 47 of the bracket engagement end will oppose the catch opening 33. When in this position, the handle can be rotated clockwise downwardly as denoted by rotation arrow R in FIG. 3B, whereupon the catch tip at the bottom of the extension arm of the engagement end of the handle will move into and engage the catch opening as shown in FIG. 3C.

Once engaged in the catch opening, the basket can be lifted. When lifted, the weight of the basket and food will maintain the engagement between the tip of the handle and the lift bracket and will hold the basket to the handle. To enhance the ability of the handle to stay engaged in the lift bracket when the basket is lifted, the angle between the gripping end of the handle and the handle's extension arm 45 (denoted by angle B in FIG. 3A) will preferably be larger than the angle between the riser wall and upper ledge portion of the lift bracket (denoted by angle C in FIG. 3A), and both angles will be obtuse angles, that is, greater than ninety degrees. This will move the top of the extension arm 45 of the engagement end of the handle back from the fulcrum (denoted by the letter F in FIG. 3C) about which the weight of the basket is rotated. Suitably, angle B between the extension wall and gripping end of the handle can be about 116 degrees and the angle C between the riser wall and upper ledge portion of the lift bracket can be about 100 degrees.

The handle can easily be detached from the basket by setting the basket on a surface to release the weight of the basket from the handle, and then lifting or rotating the handle up to release the tip 47 of the handle from the catch opening 33 of the basket's lift bracket. The lift bracket engagement of the handle can then be lifted out through the insertion opening in the upper ledge portion 37 of the lift bracket.

It is noted that the detachable handle 41 is preferably made in one piece, suitably a piece of bent metal, having a uniform flat cross-sectional shape throughout the length of the handle. However, it would be possible for the handle to be made in more than one piece and to have other cross-sectional shapes. A wood or plastic overlay could also be provided on the gripping end of the handle.

It is contemplated that the above described lift bracket and lifting handle could be used with food containers other than baskets as illustrated. For example, the lift bracket and handle could be adapted for use on pots or pans that have solid sidewalls to which the lift bracket could be attached. It is further contemplated that the lift bracket and lifting handle could be used with different shaped baskets, for example, round baskets, or with other food containers of various shapes. By providing a variety of different food containers with the same lift bracket, only one lift bracket would be required for picking up different containers.

While one embodiment of the invention has been described in considerable detail in the foregoing specification, it will be understood that it is not intended that the invention be limited to such detail, except as necessitated by the following claims.

We claim:
1. A cooking utensil comprising
a food container having a sidewall, a top portion and a bottom portion,
a lift bracket on the sidewall of said food container, said lift bracket including a riser portion having a catch opening, and an upper ledge portion extending outwardly at an angle relative to the riser portion of said lift bracket, the upper ledge portion of said lift bracket having an insertion opening in vertical plane alignment with the catch opening of the riser portion, and
a lift handle having an elongated gripping end and a lift bracket engagement end extending downwardly at an angle relative to said gripping end, the lift bracket engagement end of said handle being sized for insertion through the insertion opening in the upper ledge portion of said lift bracket, and having an inwardly projecting catch tip configured for engagement in the catch opening in the riser portion of said lift bracket, wherein the lift bracket engagement end of said lift handle can be inserted down through the insertion opening of the upper ledge portion of said lift bracket until the catch tip thereon opposes the catch opening of said lift bracket, whereupon the lift handle can be rotated to move the tip portion into said catch opening, and further whereupon the food container can be lifted with the tip portion of the lift bracket engagement end of the lift handle engaged in the catch opening of the lift bracket and with the weight of the food container maintaining such engagement.

2. The cooking utensil of claim 1 wherein the riser portion of said lift bracket has a bottom end and wherein the catch opening in the riser portion of said lift bracket is proximate the bottom portion of said riser portion.

3. The cooking utensil of claim 1 wherein the riser portion of said lift bracket angles in from the top portion of said food container to the bottom portion thereof.

4. The cooking utensil of claim 1 wherein the riser portion of said lift bracket angles in from the top portion of said food container to the bottom portion thereof at an angle of between about ten degrees and fifteen degrees from vertical.

5. The cooking utensil of claim 1 wherein the riser portion of said lift bracket is in the form of a riser wall and said catch opening is in said riser wall.

6. The cooking utensil of claim 1 wherein the insertion opening in the upper ledge of said lift handle is sized to allow play between the lift handle and lift bracket when the lift handle is inserted through the insertion opening in said lift bracket.

7. The cooking utensil of claim 1 wherein the angle between the riser portion and upper ledge portion of said lift bracket and the angle between the lift bracket engagement end and gripping end of said lift handle are obtuse angles.

8. The cooking utensil of claim 7 wherein the angle between the lift bracket engagement end and gripping end of said lift handle is greater than the angle between the riser portion and upper ledge portion of said lift bracket.

9. The cooking utensil of claim 1 wherein said lift bracket is fabricated of a single piece of bent metal.

10. The cooking utensil of claim 1 wherein said lift handle is fabricated of a single piece of bent metal.

11. A cooking utensil comprising a food container having a sidewall, a top portion and a bottom portion, a lift bracket on the sidewall of said food container, said lift bracket including a riser wall extending from the bottom portion to the top portion of the food container side wall, said riser wall having a bottom end and a catch opening proximate said bottom end, and an outwardly extending upper ledge portion having an insertion opening in vertical plane alignment with the catch opening of the riser wall, and a handle having an elongated gripping end and a lift bracket engagement end extending downwardly at an angle relative to said gripping end, the lift bracket engagement end of said handle having a cross-sectional size and configuration that allows it to be inserted through the insertion opening of the upper ledge portion of said lift bracket with play between the lift handle and lift bracket, and further having an inwardly projecting tip portion sized and shaped for engagement in the catch opening in the riser wall of said lift bracket, wherein, when the lift bracket end of the handle is inserted down through the insertion opening of the outwardly extending ledge portion of said lift bracket until said tip portion opposes said catch opening, the handle can be rotated to move the tip portion into said catch opening, whereupon the food container can be lifted with the tip portion of the lift bracket engagement end of the handle engaged in the catch opening of the lift bracket and with the weight of the food container maintaining such engagement.

12. The cooking utensil of claim 11 wherein the riser wall of said lift bracket angles in from the top portion of said food container to the bottom portion thereof.

13. The cooking utensil of claim 11 wherein the riser wall of said lift bracket angles in from the top portion of said food container to the bottom portion thereof at an angle of between about ten degrees and fifteen degrees from vertical.

14. The cooking utensil of claim 11 wherein upper ledge portion of said lift bracket extends outwardly at an obtuse angle relative to the riser portion of said lift bracket, and wherein lift bracket engagement end of said lift handle extends downwardly at an obtuse angle relative to the gripping end of said lift handle.

15. The cooking utensil of claim 14 wherein the angle between the lift bracket engagement end and gripping end of said lift handle is greater than the angle between the riser portion and upper ledge portion of said lift bracket.

\* \* \* \* \*